9696X
G. Hotchkiss.
Towing.
Patented June 2. 1836.
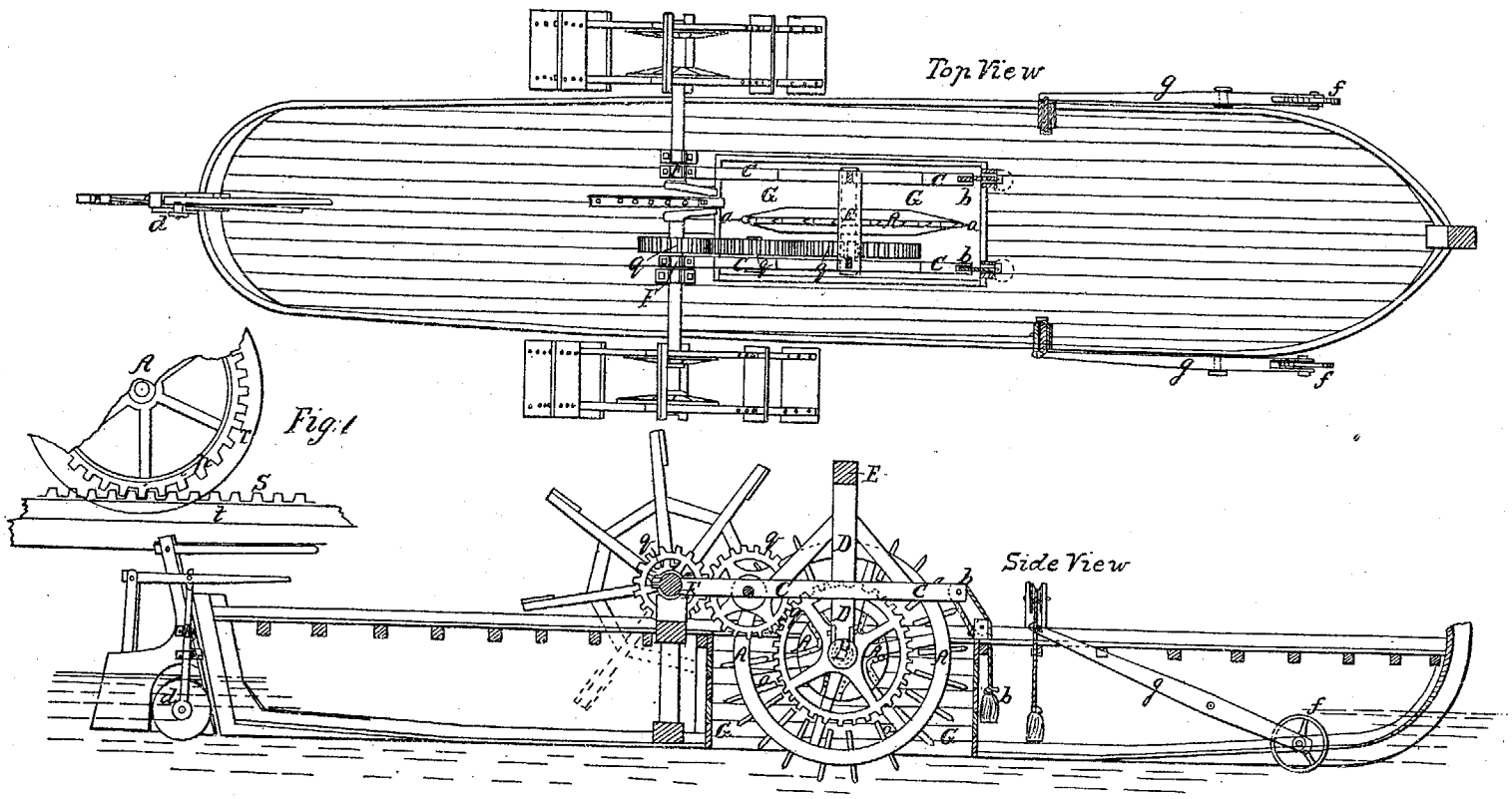
N. PETERS, PHOTO-LITHOGRAPHER, WASHINGTON, D. C.

Gideon Hotchkiss 9696X

397

The Schedule referred to in these Letters Patent and mak-
ing part of the same containing a description in the words
of the said Gideon Hotchkiss himself of his improvement in
the art of propelling or drawing Boats vessels or other
water craft. To All Whom these Presents shall
come Be it Known that I Gideon Hotchkiss of
Windsor in the County of Broome and State of New
York have invented a new and useful improvement
in the art of propelling or drawing Boats or vessels or other
water craft in shoal or swift water in Rivers and Canals
or other waters The following is a full and exact description
thereof — It consists of a Pedestrian, Traction, Pro-
pulsive, Perambulating or Ambulator Wheel or Wheels
which by revolving and rolling on the bottom of a River
canal or other water of sufficient depth to carry boats
will draw or propel them where they cannot be taken
with paddle wheels said Boats may
in the usual way & be of any shape or size to suit con-
venience or fancy. Said Wheel may be placed before
or behind or between or pass through the bottom or on
either or both sides, or in all said places in said boats
and roll or travel on a tow path in a Canal or other waters
or a rail or rails placed on the bottom or side
of a Canal or other water, said Wheel may be made
of cast or wrought iron or of wood or partly of wood
and partly of iron of such diameter as to suit the
general depth of water so that the shaft or arbor shall be
generally above water and of sufficient strength to
correspond with the size of the boat. The rim or periphery
to be so formed with spurs or projections when it is to
run on the gravel or timbers or planks at the bottom
of Rivers, canals or other waters or on their sides or towpaths or if it is to run on a rail on the side of or bottom of
rivers canals or other water, to be formed so as to correspond
with the form of the rail whether it be with or with-
out, with a projection or flanges or flanches on each
side, so as to make the wheel follow the rail similar to
those on steam carriages on common rail roads. The
shaft or arbor to be about one fourth of the diameter of the
wheel in length with flanches on each — and a guard
rail to keep the frame together. The frame to be made
with two arms one fourth greater in length than
the diameter of the pedestrian wheel with two posts
framed on the wheel arms to project one fifth of the
diameter of the wheel below and to extend above so as
to clear the wheel with a cap on the top to correspond
with the length of the shaft of the pedestrian wheel.
In the lower end of the posts the wheel is hung, the other end of the
arms to be extended to about two thirds of the diameter of the
wheel and strongly braced to keep it from rocking or wind-
ing and fastened to the boat by hinges or pivots so as to keep
the wheel in (nearly) a vertical position and permit it to rise
and fall in an opening between two boats or through the boat
so that it may roll on the bottom or rail at different depths
of water and thereby draw or propell the boat or boats forward.
This wheel may be raised up or pulled down on the bottom
or rail by pullies and weights or by levers and fulcrums or by
springs. Said wheel may be put and continued in motion
by steam or any other power communicable to a wheel at
or near the centre of motion of the wheel's frame, and from
that to the pedestrian wheel by an endless band or strap chain
running over a corresponding wheel on the arbor of the pedes-
trian wheel or in any of the known methods of gearing.
When the usual rudder becomes insufficient to guide the boat
by reason of shoal water then there may be a wheel in the 9696X 81.

rudder placed in or near the stern of the boat which
by forcing it on the bottom in a proper manner, will give
the desired direction. Also the sides of the boat may be
provided with buoy wheels of wood or cast iron attached
to levers which may be pressed on the bottom when the water
is too shallow and thereby enable the boat to pass shoals and
bars which it otherwise could not. In deep water pad-
dle wheels may be used as in other boats, moved by the same
power that moves the pedestrian wheel and when not wanted
may be raised out of the water. What I claim as my own
invention and not previously known in the above
described machinery is the aforesaid pedestrian traction
repulsion perambulating or anchor wheel, its swing-
ing frame by which it is made to follow the bottom of
rivers and canals or other water of different depths, its
adaption in shape to rails laid on the bottom of canals
or other water so that is enabled to follow the track and draw
or tow a boat or boats or other water crafts (so far as it
differs from those used on steam carriages or cars) the lightening
or weightening of said wheel, the wheel on a rudder and
its use, the buoy wheels and their use — Dated Windsor Co. N
April 12th 1836

Witnesses
G. W. Hotchkiss
S. C. Wheeler

Gideon Hotchkiss (94 words)

Drawing made from Specification.